C. H. FICKEN & L. E. TANNER.
SELF LOCKING GRAIN DUMP.
APPLICATION FILED MAR. 23, 1912.

1,045,962.

Patented Dec. 3, 1912.

2 SHEETS—SHEET 1.

WITNESSES:

INVENTORS:
C. H. Ficken
L. E. Tanner
By their Attorney.

C. H. FICKEN & L. E. TANNER.
SELF LOCKING GRAIN DUMP.
APPLICATION FILED MAR. 23, 1912.

1,045,962.

Patented Dec. 3, 1912.

2 SHEETS—SHEET 2.

WITNESSES:

INVENTORS
C. H. Ficken
L. E. Tanner
By Attorney.

UNITED STATES PATENT OFFICE.

CLAUS H. FICKEN AND LOUIS E. TANNER, OF ANCHOR, ILLINOIS.

SELF-LOCKING GRAIN-DUMP.

1,045,962.

Specification of Letters Patent. Patented Dec. 3, 1912.

Application filed March 23, 1912. Serial No. 685,726.

*To all whom it may concern:*

Be it known that we, CLAUS H. FICKEN and LOUIS E. TANNER, citizens of the United States, residing at Anchor, in the county of McLean and State of Illinois, have invented certain new and useful Improvements in Self-Locking Grain-Dumps, of which the following is a specification.

This invention relates to self-locking grain dumps for grain elevators and the like, the object of the invention being to provide simple and effective means for automatically locking the dumping frame in normal position when the trap door is closed and automatically releasing it for dumping motion when the trap door is opened, thereby preventing casual movement of the dumping frame and injury to draft animals when the dumping mechanism is not intended to be in action.

The invention consists of the features of construction, combination and arrangement of parts, hereinafter fully described and claimed, reference being had to the accompanying drawing, in which:—

Figure 1:
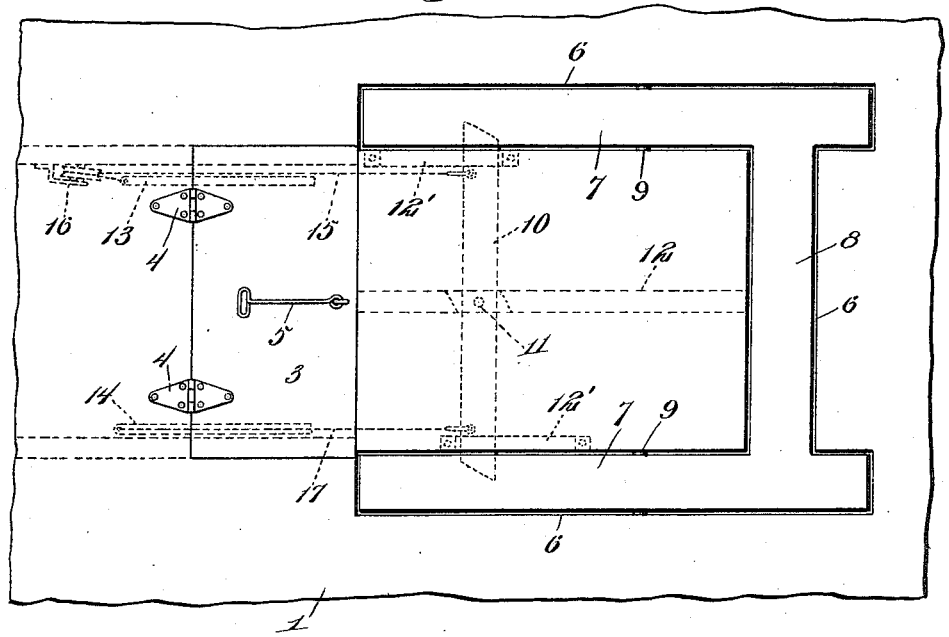
Figure 2:
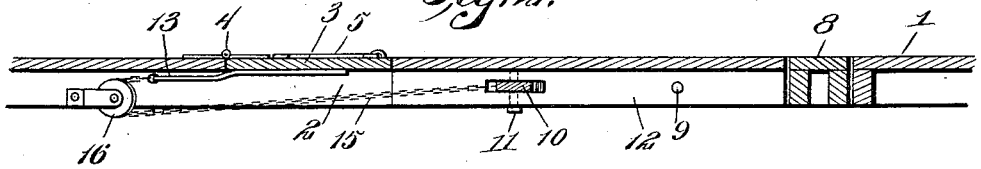
Figure 3:
Figure 4:
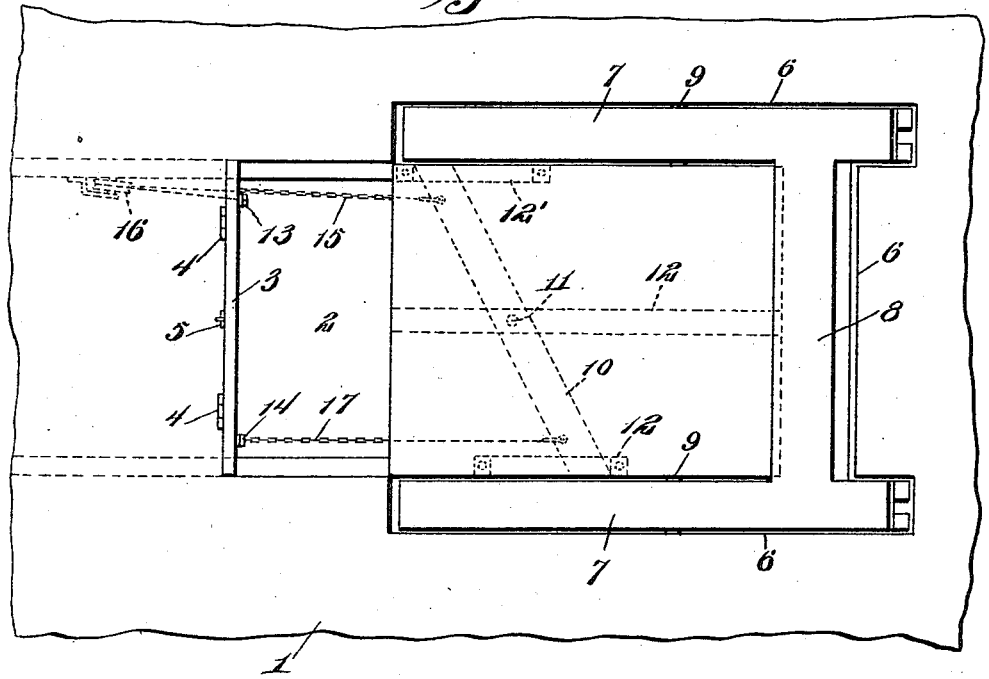
Figure 5:
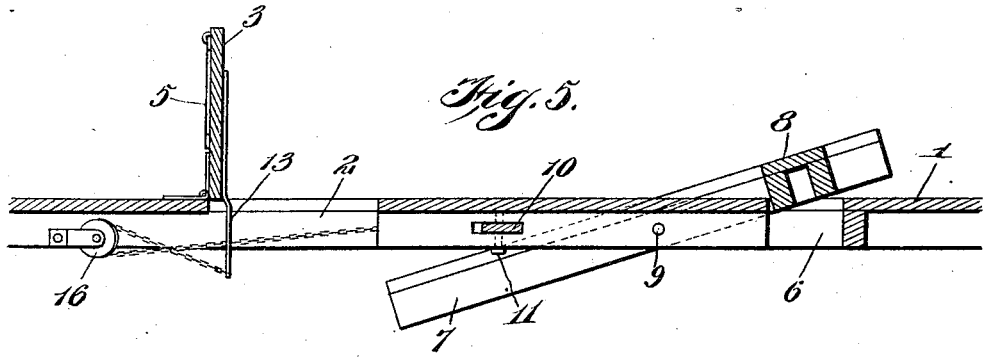
Figure 6:
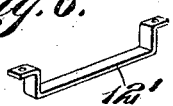

Figure 1 is a top plan view of an elevator floor or platform, showing the trap door closed and the dumping platform in normal position. Fig. 2 is a central vertical longitudinal section of the same. Fig. 3 is a vertical transverse section of the same taken on a plane through the longitudinal center of the locking bar. Fig. 4 is a view similar to Fig. 1, showing the trap door open and the dumping frame released for dumping motion. Fig. 5 is a view similar to Fig. 2, showing the trap door open and the dumping frame in dumping position. Fig. 6 is a view of one of the guide brackets.

Referring to the drawings, 1 designates the floor or platform of a grain elevator or other storage structure or receptacle, which is provided with an opening 2 through which the grain or other material is to be dumped for delivery to a bin or other suitable receiver. This opening is adapted to be normally closed by a trap door 3, hinged or pivoted, as at 4, to the rear wall of the opening, so as to adapt it to be swung upwardly and rearwardly to a normally vertical open position, as shown in Figs. 4 and 5. This door is provided with a suitable handle 5, whereby it may be conveniently opened, closed and manipulated. The door when in closed position lies flush with the surface of the floor or platform, as shown in Figs. 1 and 2. Adjacent to the opening 2, the floor or platform is provided with an opening 6, in which is arranged a dumping frame, comprising a pair of parallel longitudinal side bars 7 connected adjacent their outer ends by a cross bar 8. This frame has its side bars 7 pivotally mounted to swing vertically on horizontal transverse axes 9 suitably mounted on the floor or platform and extending across the sides of the opening 6. The frame when in closed position lies flush with the surface of the floor or platform, so as to support the wheels of a cart or wagon which is backed thereon, and from which the grain or material is to be dumped through the opening 2. The rear portion of said frame is adapted to swing down through the opening 6 under the weight of the vehicle and its contents, and is pivotally mounted so as to be counterweighted by its front end, whereby said frame is adapted to automatically return to normal position when the vehicle is driven off after the load is dumped.

The frame is adapted to be held normally from tilting motion by a locking bar 10, intermediately pivoted, as at 11, to a beam 12 arranged on the underside of that portion of the floor or platform lying between the sides of the opening 6. The ends of said bar 10 project through and are movable in fixed guide brackets 12′ and are adapted to project beneath the rear ends of the side bars 7 to hold the same from depression. Figs. 1 and 2 show the bar in locking position, while Figs. 4 and 5 show the bar retracted to permit the platform to tilt.

The trap door 3 has secured thereto metallic strips 13 and 14 forming a pair of crank arms arranged on opposite sides of its center. These crank arms project beyond the pivoted edge of the door and are adapted to extend beneath the floor or platform when the door is in closed position. A chain or other flexible element 15 is secured at its opposite ends to the crank arm 13 and one of the arms of the bar 10 and passes over a guide pulley 16 supported by the floor or platform at a point in rear of the door, so that when the door is swung open the connection 15 will be drawn upon to swing the locking bar to retracted position, while when the door is closed the connection 15 will be slackened to permit the locking bar to return to locking position. A similar flexible connection 17 directly connects the crank arm 14 with the opposite end of the locking lever 10, and is slackened when the door is opened to permit the locking bar to be retracted by the pull of the connection 15, and is drawn upon when the door is closed to swing or return the locking bar to normal locking position.

Figs. 1 and 2 show the parts as they appear normally, with the door closed and the swinging frame lying flush with the floor or platform. When the parts are in such position, the tilting frame is locked from movement, so that vehicles may be driven over the floor without liability of the frame tilting and causing injury to the vehicles or draft animals. In the use of the dumping mechanism the wagon or vehicle from which the load is to be dumped is driven or backed onto the tilting platform and the trap door pulled open by means of the handle 5, whereby the locking bar 10 will be retracted, allowing the tilting frame to swing downward, whereby the vehicle will be tilted and the load discharged through the opening 2. When the vehicle is drawn off, the platform returns to normal position, and upon the closure of the door the locking bar will be returned to normal position, thus locking the dumping frame from movement.

From the foregoing description, taken in connection with the drawing, the construction and mode of operation of our improved dumping mechanism will be readily understood, and it will be seen that simple and effective means are provided for locking the tilting frame in normal position when the trap door is closed and for releasing said dumping frame for tilting movement when the trap door is opened, thus positively locking said tilting frame against casual movement and avoiding liability of injury to vehicles, horses and pedestrians passing over the floor.

Having thus described the invention, what we claim as new is:—

1. In a self locking dumping apparatus, the combination of a floor or platform having an opening therein, a pivoted dumping frame mounted to tilt downward in said opening under the weight of a vehicle and to return automatically to normal position when released, keepers upon said floor or platform on opposite sides of the dumping frame, a transverse locking bar pivoted intermediate its ends for pivotal movement in a direction longitudinally of the dumping frame into and out of engagement with said keepers, a manually operable trap door, and connecting means between said door and the opposite arms of the locking bar for swinging said locking bar out of engagement with the keepers when the door is opened and swinging it into engagement with the keepers when the door is closed.

2. In a self locking dumping apparatus, the combination of a floor or platform having an opening therein, a pivoted dumping frame movable in the opening and adapted to tilt downward under the weight of a vehicle and to return automatically to normal position when released, keepers upon the floor or platform at opposite sides of the dumping frame, a transverse intermediately pivoted locking bar mounted to swing in a direction longitudinally of the dumping frame for engagement with or disengagement from said keepers, a manually operable trap door provided with crank arms on opposite sides of its center, a flexible connection between one of said crank arms and one arm of the bar for swinging said bar out of engagement with the keepers when the door is opened, and a flexible connection between the other crank arm and the other arm of the bar for swinging said bar to locking position when said door is closed.

3. In a self locking dumping apparatus, the combination of a floor or platform having an opening therein, a tilting dumping frame movable in the opening and adapted to tilt downward under the weight of a vehicle and to return automatically to normal position when released, keepers upon the floor or platform at opposite sides of the dumping frame, an intermediately pivoted transverse locking bar adapted to swing in a direction longitudinally of the dumping frame into and out of engagement with said keepers, a manually operable trap door provided with crank arms on opposite sides of its center, a guide pulley in rear of one of said crank arms, a flexible connection running over said pulley and terminally connected with one of the crank arms and one of the arms of the bar for swinging said bar out of engagement with the keepers when the door is opened, and a flexible connection between the other crank arm and the other arm of the bar for swinging said bar to locking position when said door is closed.

In testimony whereof we affix our signatures in presence of two witnesses.

CLAUS H. FICKEN.
LOUIS E. TANNER.

Witnesses:
W. W. WHITMORE,
ALICE M. MILLER.